March 14, 1939.   A. L. NILSSON   2,150,455
MEANS FOR BROACHING SURFACES
Filed June 30, 1934     3 Sheets-Sheet 1
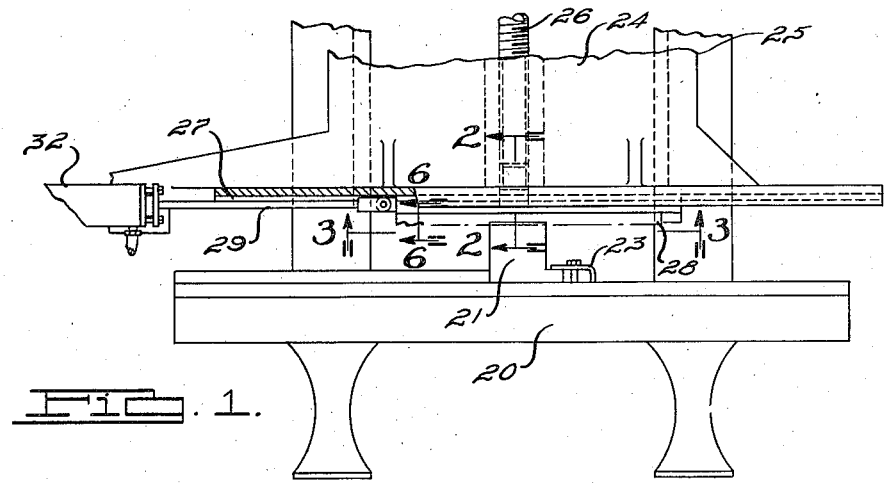
INVENTOR.
Axel L. Nilsson.
BY
Harness, Dickey, Pierce & Hans
ATTORNEYS.

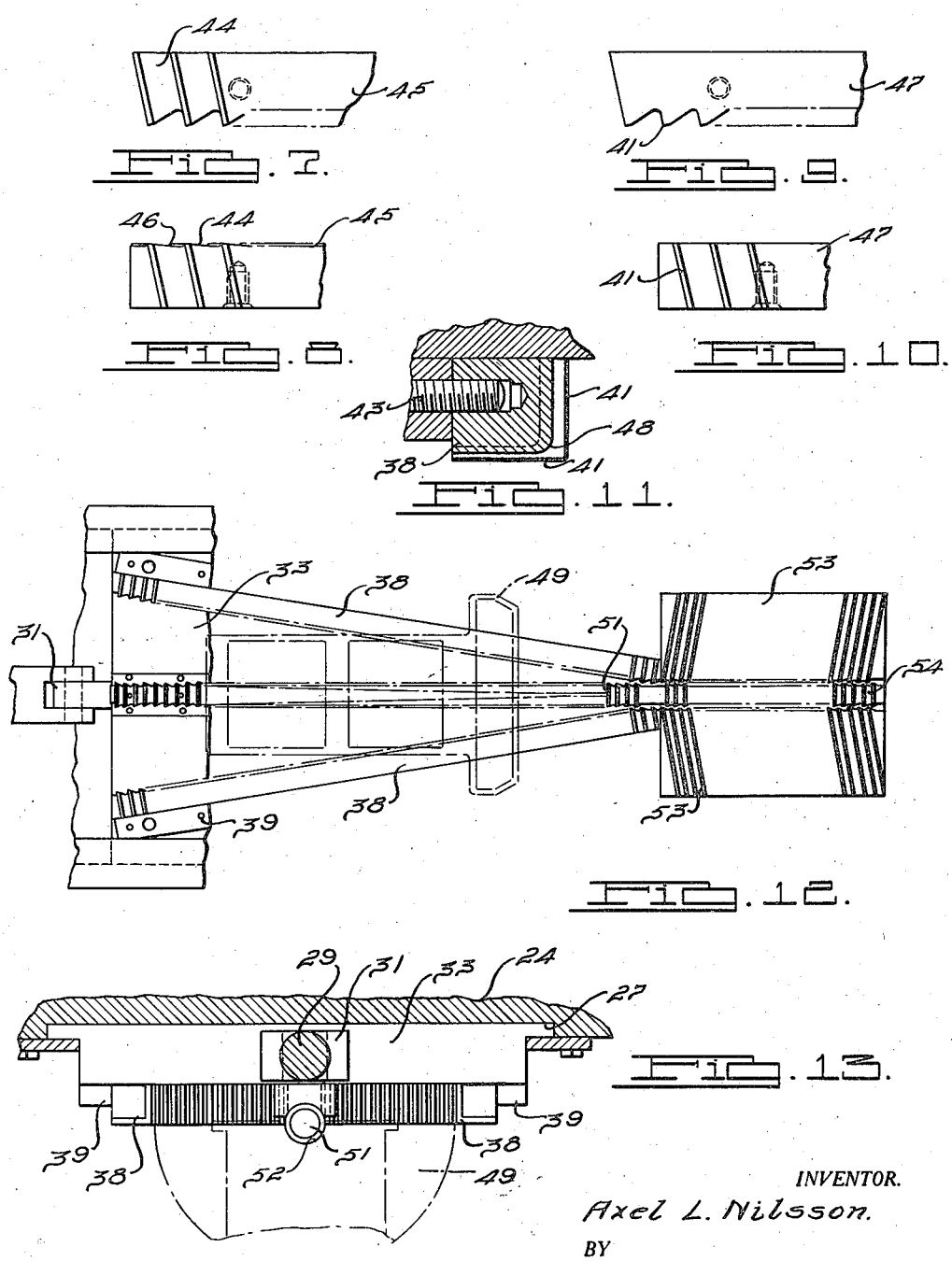

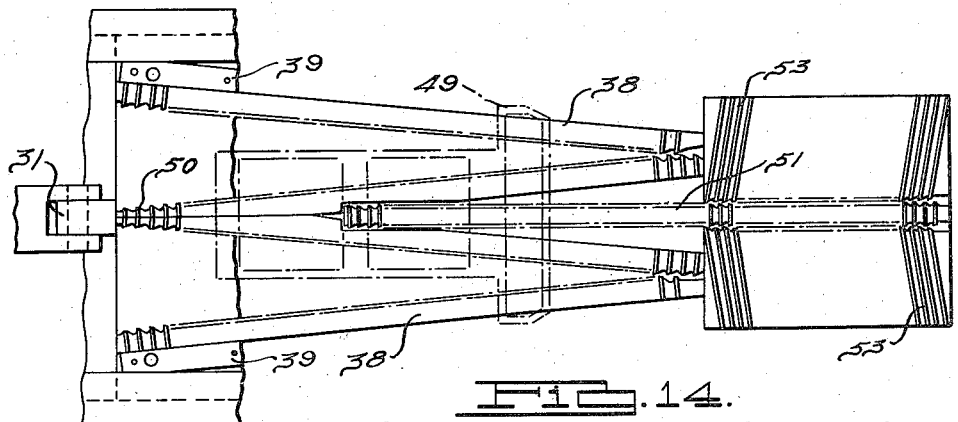
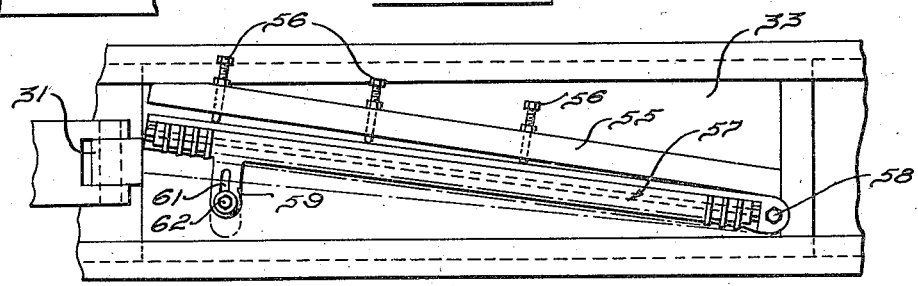
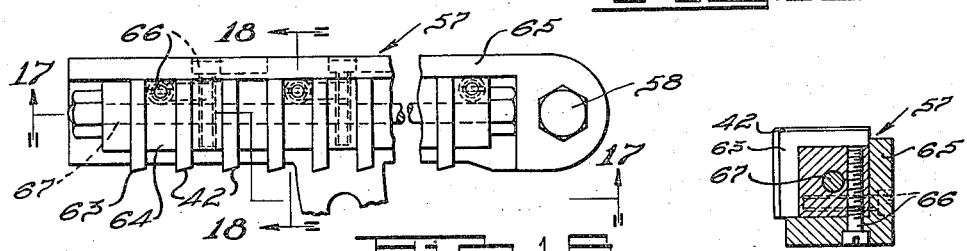
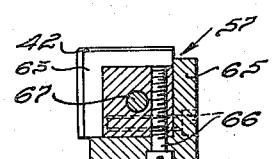
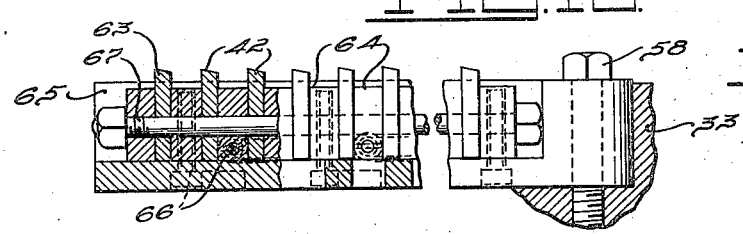

Patented Mar. 14, 1939

2,150,455

UNITED STATES PATENT OFFICE 2,150,455

MEANS FOR BROACHING SURFACES

Axel L. Nilsson, Pleasant Ridge, Mich., assignor to Colonial Broach Company, a corporation of Michigan Application June 30, 1934, Serial No. 733,184

3 Claims. (Cl. 90—33)

My invention relates to methods and means for broaching surfaces and particularly to a method and means for broaching flat surfaces by progressively machining from the side edges of such surfaces.

Heretofore, when broaching flat surfaces, broad broaching tools were employed which were drawn over the surface to plane the surface to desired dimensions. While in certain instances this method of broaching proved satisfactory, on certain materials such as castings having hard surfaces, this method proved impractical.

In practicing the present method, hard surfaces of casting or other hard material may be broached by having the cutting occur progressively from the edge inwardly across the face of the element to be surfaced, during the longitudinal movement of the broach. To effect such operation, the broach is set at an angle to its direction of movement to have the opposite ends of the broach extend across the face of the work piece. In this manner, the leading teeth will start cutting at one edge of the work piece and cutting will progressively occur across the surface as the broach is moved longitudinally. The hard surface is not directly attacked by the teeth of the broach, since the material will crumble away as the teeth progressively advance from the side edge across the top surface.

When the surface is wide, two broaches, convergingly disposed relative to the direction of movement of the broach, may be employed facing each other and spaced at one end sufficiently to span the work so as to machine progressively from opposite edges inwardly toward each other during the longitudinal movement of the broach. A scraping section may be provided on the tool following the broaching teeth to plane the rough edges produced by the teeth on the surface of the work piece when an extremely smooth surface is desired.

The broaching bar may be adjustably mounted on the tool so that the angle of the teeth relative to the work may be changed. In this manner the depth of the cut may be regulated to correspond to the types of material to be machined. The broach may be of the built-up type having a plurality of blades which are bolted or otherwise secured together and disposed in predetermined relation to each other. The built-up broaching bar may likewise be swung to be disposed at various angles to the work. The blades of the built-up broach may be readily sharpened and renewed.

Various spacing and depth of groove between the teeth may be provided to correspond to the different material upon which the teeth are to operate. When the broach is operated on cast iron or the like, teeth may be provided on the bottom and side of the broach so that the chips may pass upwardly or across the bottom of the broach free of the work. The teeth may be omitted from the bottom face when employed on more ductile material to force the chips to move upwardly so as not to clog the broach as would occur if they should catch on the corner between the two sets of teeth. Further, the corner could be rounded to prevent such catching of the chips to force them to flow in either one or the other direction.

Accordingly, the main objects of my invention are; to set a broaching bar angularly to the direction of movement of the broaching tool to effect the progressive machining of the surface of a work piece from the side edge across the face thereof; to relieve the teeth of an angularly disposed broach at an angle greater than the angle at which the broach is set relative to its direction of movement to provide a relief to the teeth relative to the work; to provide a plurality of broaching bars disposed in spaced converging relation to each other to be capable of progressively machining a surface from opposite edges of the work element; to provide a broaching bar which is adjustable angularly of the direction of movement of the broaching tool to present a different angle of attack to the material of the surface of an element across which the broach is drawn; to provide a broaching tool of the built-up type with a plurality of blades mounted in spaced relation to each other with a proper relief to the cutting edges when the broaching tool is disposed at an angle to its direction of movement; to provide a broaching tool with broaching bars one of which cuts a groove while the outer bars machine the surface of the block progressively from available edges across the face thereof; and, in general, to provide a broaching tool capable of machining the surface of a work piece from the available edges thereof which is simple in construction, economical of manufacture and positive in operation.

Other objects and features of novelty of my invention will be either specifically pointed out or will become apparent when referring, for a better understanding of my invention, to the following description taken in conjunction with the accompanying drawings, wherein:

Figure 1 is a broken view, in elevation, of a broaching machine embodying features of my invention, Fig. 2 is an enlarged sectional view of the structure illustrated in Fig. 1, taken on the line 2—2 thereof, Fig. 3 is an enlarged sectional view of the structure of Fig. 1, taken on the line 3—3 thereof, Fig. 4 is a bottom plan view of the broaching tool illustrated in Fig. 3, Fig. 5 is a view of the broaching tool illustrated in Fig. 4, taken on the line 5—5 thereof, Fig. 6 is an enlarged sectional view of the structure illustrated in Fig. 1, taken on the line 6—6 thereof, Fig. 7 is a broken view of structure similar to that illustrated in Fig. 4, showing a modified form thereof, Fig. 8 is a view, in elevation, of the structure illustrated in Fig. 7, Fig. 9 is a broken view of structure similar to that illustrated in Fig. 4, showing a further form thereof, Fig. 10 is a view, in elevation, of the structure illustrated in Fig. 9, Fig. 11 is a view of a section of the broach, similar to that illustrated in Fig. 6, showing a modified form thereof, Fig. 12 is a bottom plan view of a broach, similar to that illustrated in Fig. 3, showing a modified form thereof, Fig. 13 is a left end view of the broach as illustrated in Fig. 12, Fig. 14 is a view of a broach, similar to that illustrated in Fig. 12, showing a further form thereof, Fig. 15 is a bottom plan view of a broach, similar to that illustrated in Fig. 3, showing a further form thereof, Fig. 16 is an enlarged broken view of the broach illustrated in Fig. 15, Fig. 17 is a side view, partly in section, of the broach illustrated in Fig. 16 taken on the line 17—17 thereof, and Fig. 18 is a sectional view of the structure illustrated in Fig. 16, taken on the line 18—18 thereof.

In Fig. 1, I have illustrated a broaching machine 20 having a work piece 21 clamped thereon by suitable clamping means 23. The work piece may be of any shape having a surface which is to be planed by the broaching tool 28 during the machining operation. The planing operation is effected through the progressive advance movement of the broaching teeth laterally across the surface as the broaching tool is pulled thereacross. This is effected through the angular position of the broaching bar relative to the work. The hard scale present on the surface of a casting, for example, will be progressively cut and removed is not directly attacked by the broaching teeth as heretofore attempted when the broaching teeth were directly forced into the surface of the work piece.

A head 24 is supported on ways 25 to be adjusted vertically by a screw 26 to regulate the position of the broaching tool relative to the work. Ways 27 are provided on the head 24 which support the broaching tool 28 for movement longitudinally of the machine. Movement is effected by the pull rod 29 which is attached to the broaching tool 28 by a coupling 31. The rod 29 is connected to a hydraulic cylinder 32 to be manipulated in the usual manner.

The broaching tool 28, as illustrated in Figs. 2 and 3, includes a base 33 having extending arms 34 which are supported in the ways 27 by plates 35. The base is guided by a land 36 extending in a groove 37 on the top face of the plate. The bottom surface of the plate supports a broaching bar 38 having a plurality of teeth on its bottom and side. The broach bar is supported diagonally across the base 33 and is braced by a backing element 39.

The teeth 41 of the bar 38 are sloped at 42 at such an angle as to provide the proper degrees of relief to the cutting edges relative to the work. In view of the angular disposition of the broaching bar, the slope 42 must be materially increased over that heretofore employed and must be equal to the angle of the bar plus the degree of relief required for the cutting operation. Suitable screws 43 are employed for clamping the broach bar 38 to the base 33 and the backing element 39 thereon and to the broach bar.

As the rod 29 is drawn into the cylinder 32, the base 33 of the broach is drawn along therewith to have the teeth 41 progressively machine the top side of the work element 21. The teeth 41 are disposed to intersect the entire surface of the element 21 so that the machining operation progressively advances across the surface from one edge, as illustrated in Fig. 2. At the end of the longitudinal movement of the broach base 33, the teeth 41 will have machined entirely across the top face of the work element to produce a true, accurate surface thereon.

The chips from the cutting operation will readily flow in the grooves 44 between the teeth, both across the bottom and upwardly of the broaching bar 38 to prevent the clogging of the teeth. While teeth of this form have proved satisfactory for machining cast iron or other materials which readily crumble, difficulty has been experienced on more ductile materials when the chips do not readily break up. Such chips catch on the corners between the grooves and fail to move in either direction. The piling up of the chips loads the machine and causes damage to the broach and to the work piece.

In Figs. 7 and 8, I have illustrated a broaching bar 45 which is similar to the bar 38 with the exception that the teeth 46 on the bottom face of the bar have only a slight groove 44 therebetween to prevent any of the chips from moving therein and to cause them to move directly upwardly along the large openings 44 provided between the side teeth 41 which effect the cutting operation. The teeth 46 aid the operation by planing a smooth surface on the work piece.

In Figs. 9 and 10, I have shown a further form of broaching bar 47 which is similar to the bars 38 and 45 with the exception that the bottom teeth are entirely omitted and the side teeth 41 alone are employed for the machine operation. In Fig. 11, I have shown a modified form of broaching bar 38 wherein the corners at the intersection of the grooves 44 are rounded off at 48 to prevent the chips from catching and thereby to be forced either laterally or vertically in the groove away from the cutting edges of the teeth. When any of the above-mentioned types of broaching bars are employed, the progressive movement of the teeth across the top surface of the work element is effected during the longitudinal movement of the broach, caused by the angular disposition of the broaching bar relative to the work element.

This method not only decreases the time required for a broaching operation, but materially lengthens the life of the broaching bar and reduces the cost over a scraping type of broach which was attempted heretofore to be pulled directly across the surface of the work piece. It may readily be seen that when a hard cast iron surface is to be attacked by a scraping broach, the roughing teeth would be immediately ruined when attempting to cut directly into hard surface of the cast material. In the present construction this damage to the teeth is entirely eliminated in view of the side approach of the teeth across the surface and the breaking up of the hard cast surface during the progressive advance of the teeth across the face.

In Figs. 12 and 13, I have shown a further form of my invention wherein a broaching bar is constructed to machine the entire crank case surface of an engine block. In this operation not only is the surface of the block machined, but at the same time the bearing grooves are likewise machined in the casting. The machining is effected in the same manner by bars having teeth which progressively advance across the face of the work to machine its surface from the side edge progressively across the face as the broach is pulled longitudinally across the work. The base 33 of the broach has a pair of broaching bars 38 mounted thereon in a manner similar to that above specified relative to the construction illustrated in Fig. 3 with the exception that the cutting edges face toward each other and the bars are converging with the open ends of sufficient width to engage the outer surface of the work, in this instance the engine block 49.

A round broach 51 of conventional design may be disposed centrally of the broaching bars 38 for the purpose of machining a bearing groove 52 in the block. At the rear end of the broaching base 33, scraping plates 53 may be employed on either side of the finishing end 54 of the bearing groove broach 51 for the purpose of scraping the top surface of the block after the machining operation to eliminate the teeth marks therefrom and to provide a perfectly smooth finish to the surface.

During the pulling of the broach by the pull bar 29 through the connection 31, the broaching bars 38 machine from opposite sides of the block inwardly toward the center, machining the surface thereof in the same manner as the surface of the element 21 was machined, with the exception that the machining occurs from both edges toward the center. During this machining operation the bearing grooves are likewise machined and near the end of the machining operation, a final planing of the surface may be effected by the scraping blocks 53, while a finishing operation will be effected on the bearing grooves by the finishing portion 54 of the broach 51.

In Fig. 14, I have shown a further construction of my invention wherein pairs of bars 38 are employed. This is made possible by the interruption of the surface at the center of the block by the bearing groove 52 which may be roughed cast therein.

In this construction each half of the bearing block is machined by the pairs of broaching bars 38 which are disposed on each side of the central bearing groove broach 51, which is shortened and disposed as illustrated in the figure. The central adjacent ends 50 of the pairs of broaching bars 38 enter the groove 52 to machine outwardly therefrom while the outer broaching bars 38 machine inwardly from the edges as the broach is drawn across the block. The broach may be materially shortened in view of the fact that only half of the surface of the block is machined by each pair of broaching bars during the pull operation. The scraping blocks 53 may be employed in rear of the pairs of broaching bars 38 as in the structure of Figs. 12 and 13 for effecting a final finish to the surface.

It will thus be seen that the broach may be constructed in any manner, depending upon the shape of the work piece and the number of edges where the broaching bars may enter to effect a side machining operation. When a large surface is divided by several grooves passing therethrough the broach may be shortened by employing broaching bars at each groove to be oppositely disposed to machine outwardly therefrom while others are machining from the opposite direction inwardly toward the grooves. The shape and construction of the broach may change in accordance with the shape and contour of the work element having a surface to be machined.

In Figs. 15 to 18, I have shown a further form of broach, one that is more universal in operation, which may be adjusted at various angles to regulate the amount of depth the teeth will cut. The further novelty of the broach resides in its built-up teeth which may be readily removed and sharpened and adjusted in any manner relative to its support. The broach base 33 has a backing bar 55 thereon having a plurality of adjusting screws 56. The broaching bar 57 is of the built-up type and is pivoted at the rear end on the pivot 58 while the opposite end is provided with an arm 59 having a slot 61 through which a clamping bolt 62 projects. The broach 57 may be adjusted to any angle relative to the base 33 and may be clamped by the bolts 56 and 62 against movement. This angular adjustment of the broach regulates the amount of surface which will be machined and at the same time regulates the depth of cut effected by each tooth. It is to be understood that with different materials, a different amount of machining may be effected by the teeth. Cast iron, for example, is susceptible to a greater depth of cut than a steel alloy. while the same will be true of a bearing metal or a bronze.

The broaching bar 57 is illustrated enlarged in Figs. 17 and 18 and comprises a plurality of blades 63 spaced by a plurality of blocks 64 which are secured in a holder 65 by suitable bolts 66. A threaded rod 67 extends through the blades 63 and the blocks 64 for securing them in clamped relation. The relief 42 provided on the teeth is sufficient to provide the desired clearance when the broach is disposed at its greatest angle, so that free machining will always be effected by the teeth during the machining operation.

While I have illustrated a particular construction of blades, spacing elements and means for securing them together and in a holder, it is to be understood that other forms of blades and elements may be provided such as wedges, channel elements and the like, it being understood that the construction shown is employed primarily for the purpose of illustration. When a sharpening operation is to be effected on the teeth, the blades may be removed and faced on a suitable machine and reassembled in the holder as shown.

The various broaches herein described and illustrated are constructed for the particular purpose of facing a work element by having the teeth progressively machine across the face from a side edge during the time the broach is pulled longitudinally. This is effected by having the broaching bar disposed at an angle with its ends projecting beyond the width of the surface to be machined. An angle is provided to the cutting edges such that the desired relief will be present between the teeth and the material of the work element irrespective of the angularity of the broaching bar relative to its direction of movement. When it is desired to eliminate all teeth marks from the surface machined by the broaching bar a scraping portion may be provided rearwardly of the broach to dress such marks from the surface during the final movement of the broach thereacross. The actual machining, however, is effected through the progressive cutting by the teeth from the side edges across the surface being machined.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. The combination with a broaching machine, of means for supporting a work piece to be surfaced, broaching bars convergingly disposed to have the inner sides facing each other, teeth on each of said inner sides, the spaced ends of said bars being of a width to receive opposite side edges of said work piece, the adjacent ends of said bars disposed to machine the central portion of said work element, and means for pulling said broaching bars across the work element to have the teeth thereof progressively cut inwardly from side edges to machine the top surface during the longitudinal movement of the broach.

2. The combination with a broaching machine, of means for supporting a work piece to be surfaced, broaching bars convergingly disposed to have the inner sides facing each other, teeth on each of said inner sides, the spaced ends of said bars being of a width to receive opposite side edges of said work piece, the adjacent ends of said bars disposed to machine the central portion of said work element, means for pulling said broaching bars across the work element to have the teeth thereof progressively cut inwardly from the side edges to machine the surface during the longitudinal movement of the broach, and a scraping block provided rearwardly of said broaching bars for dressing the teeth marks from the surface machined.

3. A broaching machine for finishing the surface on a work element including, in combination, a pair of angularly disposed broaching bars convergingly disposed to have the inner sides facing each other, teeth on each of said inner sides, the ends of said bars being spaced to engage opposite sides of the work element, a broach disposed therebetween for machining a groove interjacent the edges of said surface, means for securing said broaches in unit fixed relation, and means for drawing said broaches across the surface to have the teeth progressively cut inwardly from the outer edges and to machine the groove during the longitudinal movement.

AXEL L. NILSSON.